May 28, 1957 A. N. EMMONS ET AL 2,793,485
GRASS TRIMMER
Filed April 5, 1954 2 Sheets-Sheet 2
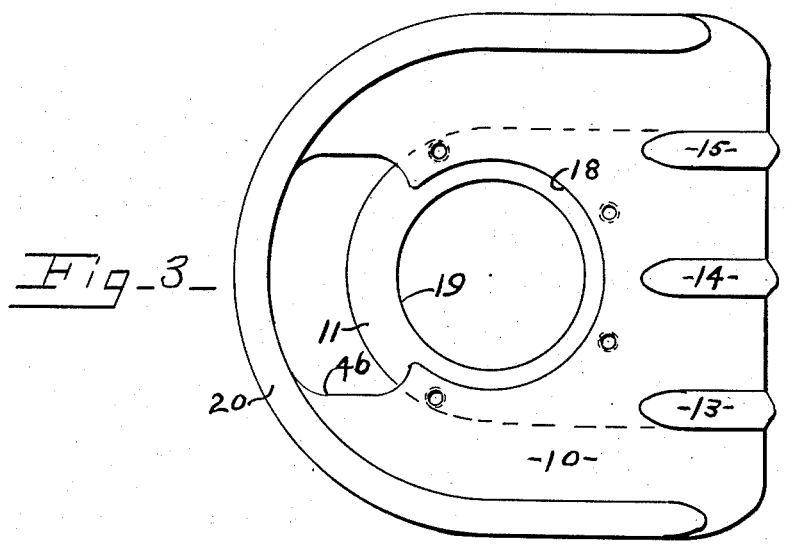
Fig-3-
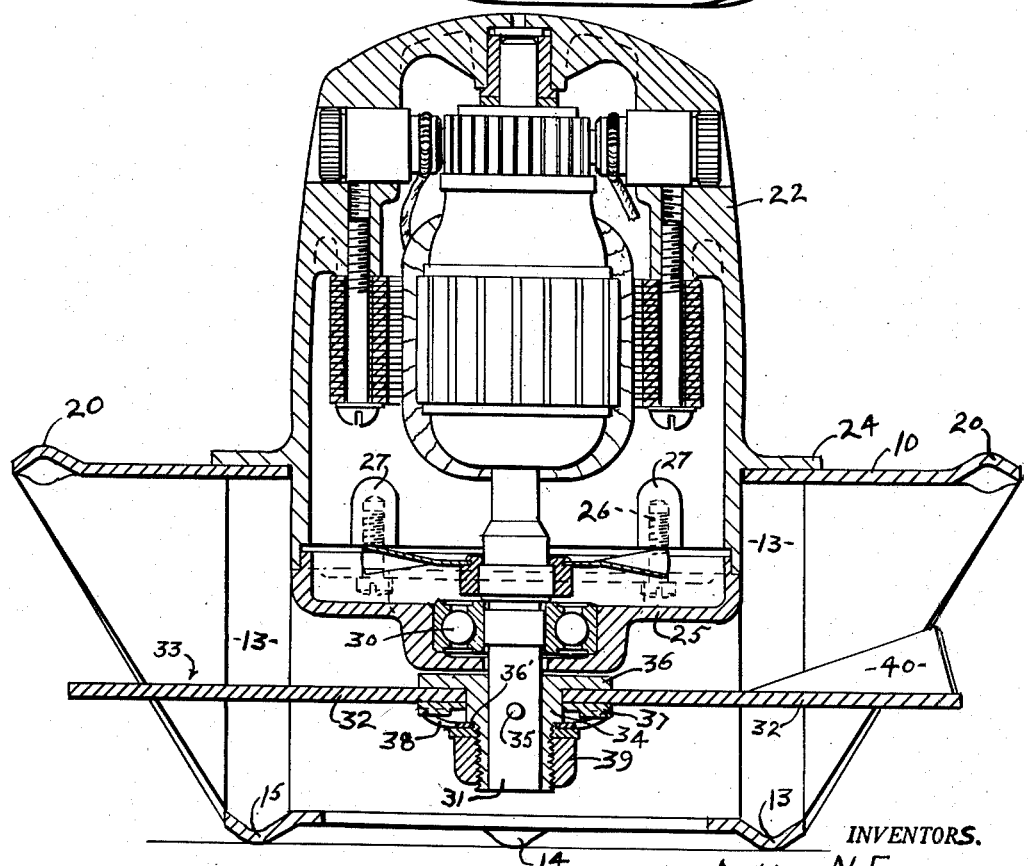
Fig-4-
INVENTORS.
Arthur N. Emmons
BY John G. Bentley
D. Emmett Thompson
ATTORNEY.

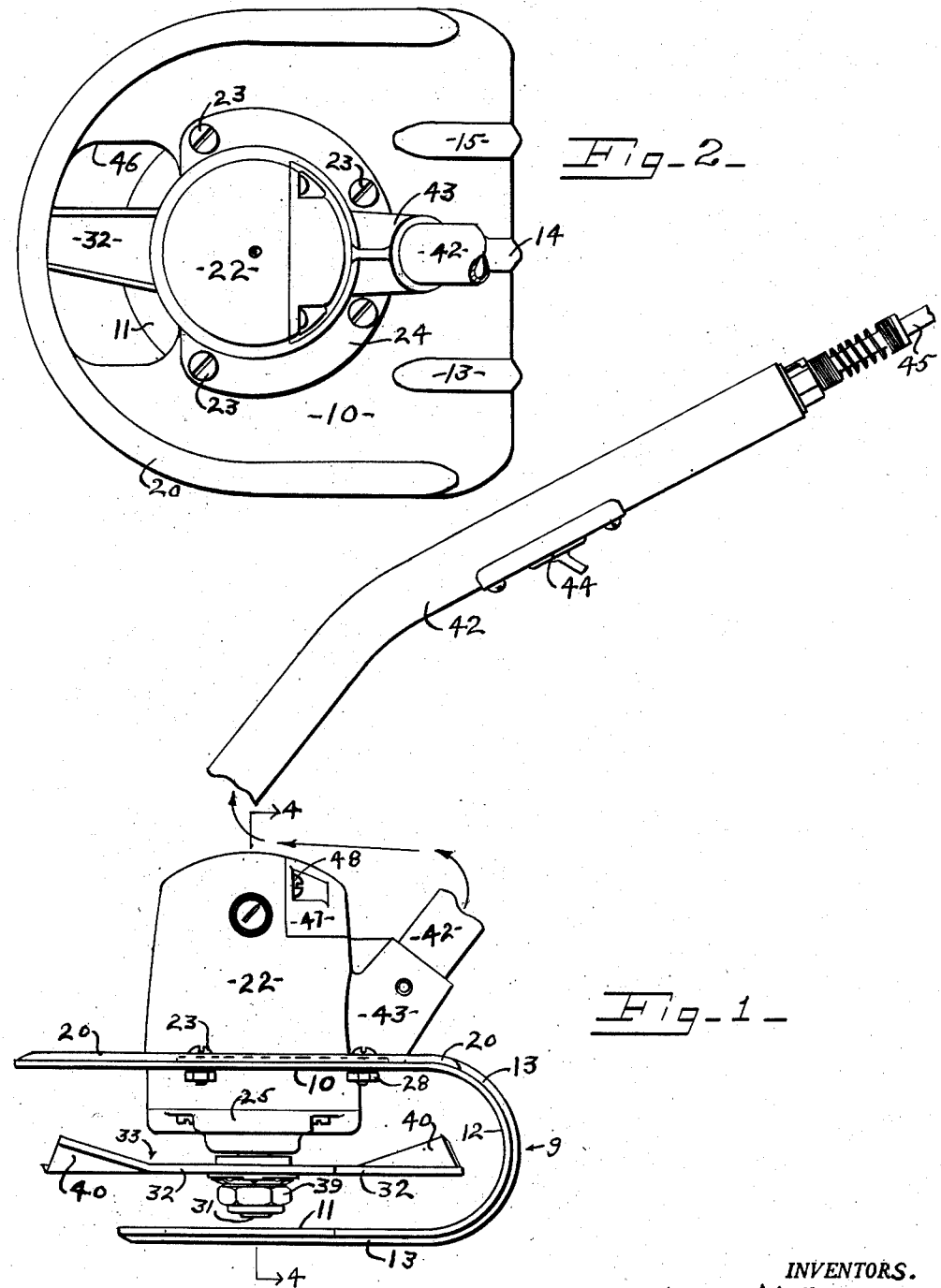

United States Patent Office 2,793,485
Patented May 28, 1957

2,793,485
GRASS TRIMMER

Arthur N. Emmons, Nedrow, and John G. Bentley, Liverpool, N. Y., assignors to The Porter-Cable Machine Company, Syracuse, N. Y., a corporation of New York Application April 5, 1954, Serial No. 420,884
1 Claim. (Cl. 56—25.4)

This invention relates to power operated grass cutters and more particularly to power operated, manually manipulated cutters generally known as grass trimmers. These devices are not provided with ground wheels and are bodily manipulated by means of a handlebar. The devices are used to trim grass around and in proximity to trees, shrubs, walls etc.

This invention has as an object a grass trimmer of the indicated character embodying a compact, lightweight structure which is practically economical to manufacture.

The nature of the invention and its distinguishing features will be readily apparent when the following specification is read in connection with the accompanying drawings, in which:

Fig. 1 is a fragmentary side elevational view of a grass trimmer embodying my invention.

Fig. 2 is a top plan view of the structure shown in Fig. 1, with a portion of the handle broken away.

Fig. 3 is a top plan view of the frame.

Fig. 4 is an enlarged vertical section view taken on line 4—4 of Figure 1.

The frame 9 of the trimmer consists of an integral member formed with a top plate portion 10 and a bottom plate portion 11. The upper and lower plate portions 10 and 11 are connected at like ends by a curved portion 12, see Figure 1. Preferably, and as shown, the frame is shaped from sheet metal stock and is formed with a plurality, in this instance three, ribs 13, 14, 15. These ribs extending lengthwise of the bottom portion 11 and upwardly around the intermediate portion 12 and forwardly in the top portion 10. The forward or front ends of the portions 10, 11 are formed on a curvature as shown in Figs. 2 and 3.

The upper portion 10 is formed with an aperture 18 and the lower portion 11 is formed with a smaller aperture 19. The apertures 18, 19 are in vertical alignment and the top portion 10 is formed at its periphery with a rib 20.

A housing 22 is detachably mounted on the top portion 10, as by screws 23, extending through apertures formed in a radial flange 24 formed on the housing and threading into the top wall 10. The screws in the structure shown are provided with nuts 28.

The lower portion of the housing 22 extends downwardly through the aperture 18, and an end shell 25 is detachably affixed thereto as by screws 26 threaded into bosses 27 formed in the motor housing 22. A motor is vertically mounted in the housing 22, see Fig. 4, and has its shaft extending downwardly through a bearing 30 mounted in the end shell 25. A cutter 33 of the bar type is fixed to the motor shaft 31 and has a pair of arm portions 32 extending radial from the shaft. The cutter bar being mounted on a sleeve 34 fixed to the shaft as by a pin 35. The sleeve 34 is formed with a radial flange 36, against which the cutter bar 33 is frictionally held by a collar 37 engaged by a spring washer 38 locked against a shoulder 36′ on the sleeve, by a nut 39 threaded on the sleeve 34.

With this arrangement there is maintained a frictional drive, of predetermined value, between the shaft 31 and the cutter, whereby the cutter bar is free to slip in the event it accidentally engages a solid object, thus relieving the motor from a sudden overload. The arm portions 32 of the cutter are formed with bent up portions 40, which serve as fan blades to lift the grass and effect radial discharge of the grass trimmings.

The device is manipulated by a handlebar 42 fixedly secured in a socket 43 formed integrally with the housing 22. The handlebar extends upwardly and rearwardly, and is provided with a switch 44 for connecting and disconnecting the motor to the lead cord 45.

The top wall 11 of the frame is also formed with an opening 46 through which the operator may view the action of the cutter.

The upper end of the motor housing 22 is formed with an opening of substantial dimension which is provided with a closure 47, detachably fixed to the housing by screws 48. Removal of the closure permits inspection and servicing of the motor. By means of the end shell 25 and the closure 47, the housing is totally enclosed. This protects the motor from dirt, grass trimmings, etc., however, the motor is effectively cooled by the discharge of air against the housing by the fan blade portions 40 of the cutter. This air flow is directed upwardly through the opening 46 against the exterior of the housing.

In operation, the device is supported by the bottom portion 11 of the frame engaging the ground. The ribs 13—15 serving as runners whereby the device may be conveniently manipulated by the handlebar 42.

What we claim is:

A grass trimmer comprising an integral frame formed with upper and lower plate portions arranged in vertical spaced relation, said portions being connected at like ends by an intermediate curved portion, said upper and lower portions having aligned centrally located apertures, a totally enclosed housing detachably mounted on said upper portion and having a portion extending downwardly through the aperture therein, a socket formed integral with said housing, a handle bar detachably secured in said socket and extending upwardly therefrom, a motor mounted vertically in the housing and having a power shaft with an end portion terminating below said housing, a cutter fixed to the motor shaft for rotation thereby intermediate said upper and lower plate portions of the frame, the upper plate portion of said frame being formed with an opening contiguous to the aperture therein, said cutter being formed with fan blade portions operable to direct an air blast upwardly through said aperture in said lower plate portion and through said opening in said upper plate portion in contact with the exterior of said housing.

References Cited in the file of this patent
UNITED STATES PATENTS

| | | |
|---|---|---|
| 2,115,265 | Jennett | Apr. 26, 1938 |
| 2,149,463 | Orr | Mar. 7, 1939 |
| 2,263,431 | White | Nov. 18, 1941 |
| 2,487,224 | Dreischerf | Nov. 8, 1949 |
| 2,539,619 | Goodall | Jan. 30, 1951 |
| 2,597,774 | Britten | May 20, 1952 |
| 2,660,847 | Britten | Dec. 1, 1953 |
| 2,707,362 | Thelander | May 3, 1955 |